United States Patent
Yoshimura et al.

(10) Patent No.: US 10,815,315 B2
(45) Date of Patent: Oct. 27, 2020

(54) METHOD FOR PRODUCING POLYOLEFIN

(71) Applicant: Sumitomo Chemical Company, Limited, Tokyo (JP)

(72) Inventors: Naoto Yoshimura, Ichihara (JP); Satoshi Itoguchi, Ichihara (JP); Masayuki Arakawa, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 99 days.

(21) Appl. No.: 16/114,429

(22) Filed: Aug. 28, 2018

(65) Prior Publication Data
US 2019/0062463 A1    Feb. 28, 2019

(30) Foreign Application Priority Data
Aug. 29, 2017 (JP) ................. 2017-164707

(51) Int. Cl.
C08F 2/01 (2006.01)
C08F 2/34 (2006.01)
(Continued)

(52) U.S. Cl.
CPC .............. *C08F 2/001* (2013.01); *B01J 8/18* (2013.01); *B01J 8/1809* (2013.01); *B01J 8/1827* (2013.01);
(Continued)

(58) Field of Classification Search
CPC .... C08F 2/001; C08F 2/01; C08F 2/34; C08F 10/02; C08F 10/06; B01J 8/18;
(Continued)

(56) References Cited

U.S. PATENT DOCUMENTS 5,798,309 A * 8/1998 Breuers ............... B01J 8/003
                                                    502/111
5,928,612 A   7/1999 Chinh
(Continued)

FOREIGN PATENT DOCUMENTS

EP   0192427 A1   8/1986
EP   2109498 A1   10/2009
(Continued)

OTHER PUBLICATIONS

Search Report dated Dec. 13, 2018 in EP Application 18189386.8.

*Primary Examiner* — William K Cheung
(74) *Attorney, Agent, or Firm* — Panitch Schwarze Belisario & Nadel LLP

(57) ABSTRACT

A method for producing a polyolefin is provided. The method includes steps of polymerizing an olefin in a first gas-phase polymerization tank to obtain polyolefin-containing particles, transferring the polyolefin-containing particles to a second gas-phase polymerization tank through a transfer pipe, and polymerizing an olefin in the presence of the transferred polyolefin-containing particles in the second gas-phase polymerization tank. A connection place between the first gas-phase polymerization tank and the transfer pipe is higher than a connection place between the second gas-phase polymerization tank and the transfer pipe. 130 kPa≥$P_1$−$P_2$≥0 is satisfied, where $P_1$ represents the pressure in the first gas-phase polymerization tank and $P_2$ represents the pressure in the second gas-phase polymerization tank.

5 Claims, 7 Drawing Sheets

(51) Int. Cl.
*B01J 8/18* (2006.01)
*B01J 8/26* (2006.01)
*B01J 8/28* (2006.01)
*C08F 10/06* (2006.01)
*C08F 10/02* (2006.01)
*C08F 2/00* (2006.01)
*B01J 8/24* (2006.01)
*B01J 19/18* (2006.01)

(52) U.S. Cl.
CPC .............. *B01J 8/245* (2013.01); *B01J 8/26* (2013.01); *B01J 8/28* (2013.01); *B01J 19/1818* (2013.01); *B01J 19/1862* (2013.01); *C08F 2/01* (2013.01); *C08F 2/34* (2013.01); *B01J 2208/00539* (2013.01); *B01J 2219/0004* (2013.01); *C08F 10/02* (2013.01); *C08F 10/06* (2013.01)

(58) Field of Classification Search
CPC ........ B01J 8/1809; B01J 8/1827; B01J 8/245; B01J 8/26; B01J 8/28; B01J 19/1818; B01J 19/1862; B01J 2208/00539; B01J 2219/0004
USPC .......................................................... 526/88
See application file for complete search history.

(56) References Cited

U.S. PATENT DOCUMENTS

| | | | |
|---|---|---|---|
| 6,596,824 B2 * | 7/2003 | Nambu | .................. C08F 10/00 526/82 |
| 2004/0230014 A1 | 11/2004 | Kougo | |
| 2009/0149610 A1 | 6/2009 | Sato et al. | |
| 2009/0149620 A1 | 6/2009 | Sato et al. | |
| 2010/0092252 A1 | 4/2010 | Force et al. | |
| 2010/0305283 A1 | 12/2010 | Dorini et al. | |
| 2010/0311923 A1 | 12/2010 | Sato et al. | |
| 2012/0245309 A1 | 9/2012 | Sato et al. | |

FOREIGN PATENT DOCUMENTS

| | | |
|---|---|---|
| EP | 2738184 A1 | 6/2014 |
| JP | 2003277412 A | 10/2003 |
| JP | 2007284548 A | 11/2007 |
| JP | 2009161735 | 7/2009 |
| JP | 2010280869 A | 12/2010 |
| WO | 2008095807 A1 | 8/2008 |

\* cited by examiner

METHOD FOR PRODUCING POLYOLEFIN

CROSS-REFERENCE TO RELATED APPLICATION

This application claims priority under 35 U.S.C. § 119(b) to Japanese Patent Application No. 2017-164707, filed on Aug. 29, 2017, the disclosure of which is incorporated herein by reference in its entirety.

TECHNICAL FIELD

The present invention relates to a method for producing a polyolefin using two or more gas-phase polymerization tanks.

BACKGROUND

As a method for producing a polyolefin, a process with use of a polyolefin production system equipped with two or more gas-phase polymerization tanks connected through a transfer pipe, including polymerizing an olefin in a first gas-phase polymerization tank, transferring polyolefin particles thus obtained to a second gas-phase polymerization tank, and polymerizing an olefin in a second gas-phase polymerization tank, in the presence of the polyolefin particles, to produce a polyolefin is conventionally known.

In such a method for producing a polyolefin, a step of transferring polyolefin particles polymerized in the first gas-phase polymerization tank to the second gas-phase polymerization tank through the transfer pipe is included. For example, Japanese Unexamined Patent Publication No. 2007-284548 discloses a method for producing a polyolefin with use of a polyolefin production system having a connection place between a first polymerization tank and a transfer pipe located lower than a connection place between a second polymerization tank and the transfer pipe, with the transfer pipe having an upward gradient from the first polymerization tank to the second polymerization tank, comprising a step of intermittently transferring polymerized polyolefin particles from the first polymerization tank to the second polymerization tank, with the pressure in the first polymerization tank being higher than the pressure in the second polymerization tank by about 400 kPa, through switching operations of on-off valves disposed in the transfer pipe by utilizing a gas pressure difference between the polymerization tanks.

SUMMARY

Recently, further improvement in production efficiency of a polyolefin has been desired, so that improvement in the output per volume of a gas-phase polymerization tank is required.

Under the circumstances, an object of the present invention is to provide an efficient method for producing a polyolefin with use of a polyolefin production system equipped with two or more gas-phase polymerization tanks connected through a transfer pipe, capable of increasing the output of a polyolefin per total volume of all of the gas-phase polymerization tanks.

The present invention relates to a method for producing a polyolefin with use of a polyolefin production system equipped with a first gas-phase polymerization tank and a second gas-phase polymerization tank connected to the first gas-phase polymerization tank through a transfer pipe. The present invention comprises the following steps 1 to 3, and satisfies the following requirements 1 and 2.

Step 1: a step of polymerizing an olefin in the first gas-phase polymerization tank to obtain polyolefin-containing particles;

Step 2: a step of transferring the polyolefin-containing particles obtained in the step 1 to the second gas-phase polymerization tank through the transfer pipe; and Step 3: a step of polymerizing an olefin in the presence of the polyolefin-containing particles transferred in the step 2 in the second gas-phase polymerization tank; and Requirement 1: the connection place between the first gas-phase polymerization tank and the transfer pipe is higher than the connection place between the second gas-phase polymerization tank and the transfer pipe; and Requirement 2: when $P_1$ represents the pressure in the first gas-phase polymerization tank and $P_2$ represents the pressure in the second gas-phase polymerization tank, 130 kPa$\geq P_1 - P_2 \geq 0$ is satisfied.

According to the present invention, since the connection place "a" between the first gas-phase polymerization tank and the transfer pipe is located higher than the connection place "b" between the second gas-phase polymerization tank and the transfer pipe, the polyolefin particles can be transferred even with a smaller pressure difference than ever before, by utilizing gravity.

Hereupon, $P_1 - P_2 > 0$ can be satisfied.

Also, in at least one of the first gas-phase polymerization tank and the second gas-phase polymerization tank, a spouted bed of the polyolefin particles can be formed.

Also, the polymerization in each of the step 1 and the step 3 can be performed in the presence of a catalyst.

Also, the transfer pipe comprises a valve, and in the step 2, the transfer amount of the polyolefin particles can be adjusted through aperture adjustment of the valve.

According to the present invention, in producing a polyolefin with use of a polyolefin production system equipped with two or more gas-phase polymerization tanks connected through a transfer pipe, the output of a polyolefin per total volume of all of the gas-phase polymerization tanks can be increased, so that an efficient method for producing a polyolefin can be provided.

DETAILED DESCRIPTION

Figure 1:
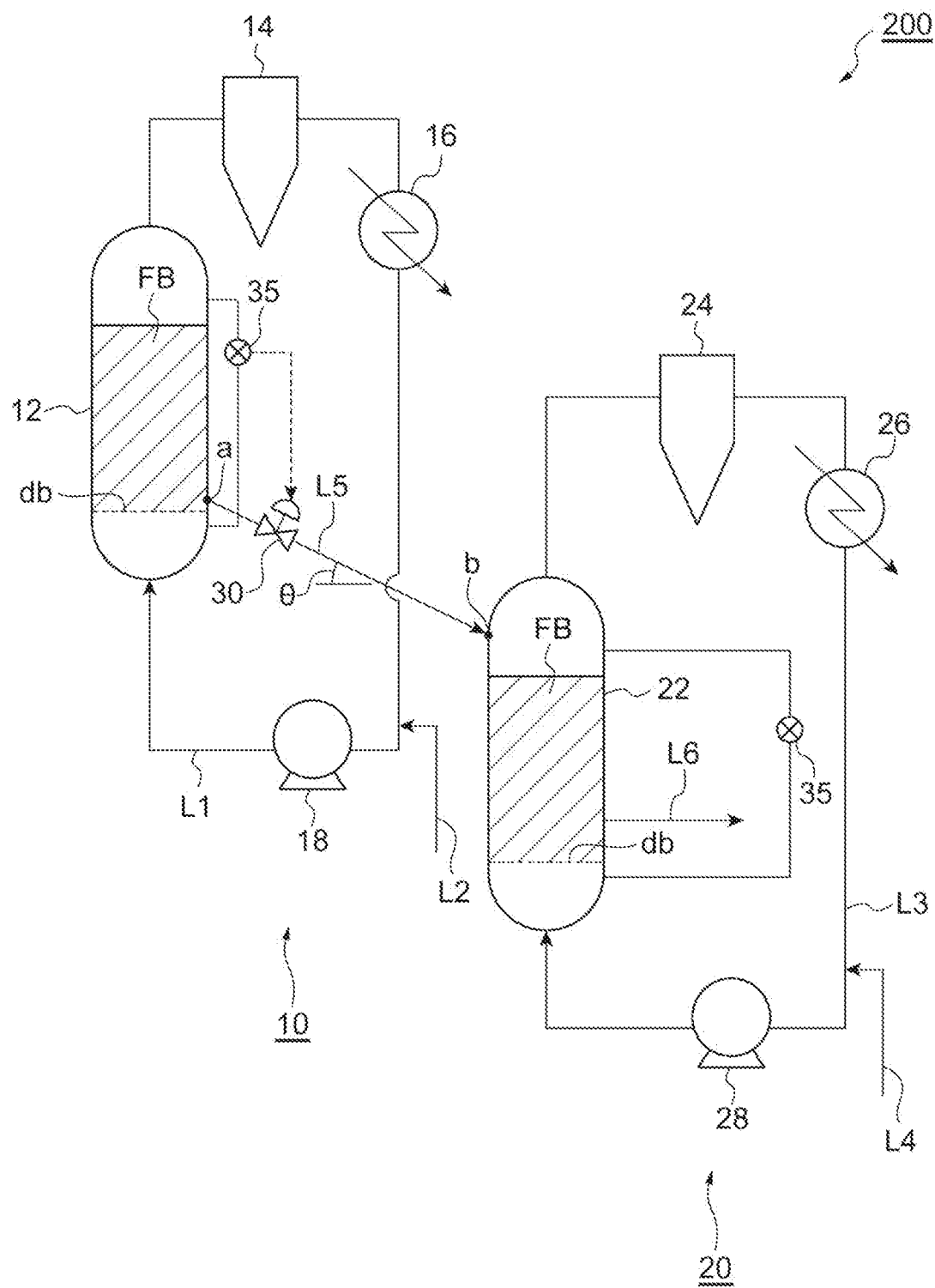
FIG. 1 is a schematic diagram illustrating a production system of a polyolefin in one embodiment of the present invention.

With reference to drawings, the preferred embodiments of the present invention are described in detail bellow. FIG. 1 is a flow diagram illustrating a production system 200 of a polyolefin in one embodiment of the present invention. The production system 200 mainly comprises a first gas-phase polymerization system 10, a second gas-phase polymerization system 20, and a transfer pipe L5 that connects them.

(First Gas-Phase Polymerization System and Second Gas-Phase Polymerization System)

The first gas-phase polymerization system 10 mainly comprises a first gas-phase polymerization tank 12 and a circulation line L l that returns the gas discharged from the top of the first gas-phase polymerization tank 12 to the bottom. The second gas-phase polymerization system 20 mainly comprises a second gas-phase polymerization tank 22 and a circulation line L3 that returns the gas discharged from the top of the second gas-phase polymerization tank 22 to the bottom.

A gas of an olefin is fed to the circulation line L1 through a line L2. A gas of an olefin is fed to the circulation line L3 through a line L4. Alternatively, other than an olefin, hydrogen and/or an inert gas such as nitrogen may be fed to the circulation lines L1 and L3 through the line L2 and the line L4, respectively.

In the first gas-phase polymerization tank 12 and the second gas-phase polymerization tank 22, the olefin fed through the circulation lines L1 and L3, respectively, are polymerized in a gas phase to obtain polyolefin-containing particles. Specifically, it is preferred that in the first gas-phase polymerization tank 12 and the second gas-phase polymerization tank 22, olefin polymerization reactions are performed, respectively, with catalyst-containing polyolefin particles being fluidized or spouted by the olefin gases fed through the circulation lines L1 and L3.

For example, in the case of particles to be fluidized in both of the first gas-phase polymerization tank 12 and the second gas-phase polymerization tank 22, as shown in FIG. 1, a gas dispersion plate db is disposed at the bottom of the first gas-phase polymerization tank 12 and the second gas-phase polymerization tank 22, and the gas fed from the circulation line L1 or L3 is fed under the gas dispersion plate db, so that the polyolefin particles are fluidized on the gas dispersion plate db to form a fluidized bed FB. In order to stably form the fluidized bed FB, feeding an amount of gas to achieve the minimum fluidization velocity Umf or more described in Japanese Unexamined Patent Publication No. 2009-161735 is preferred. The fluidized bed FB is a portion of particles fluidized above a dispersion plate.

Figure 2:
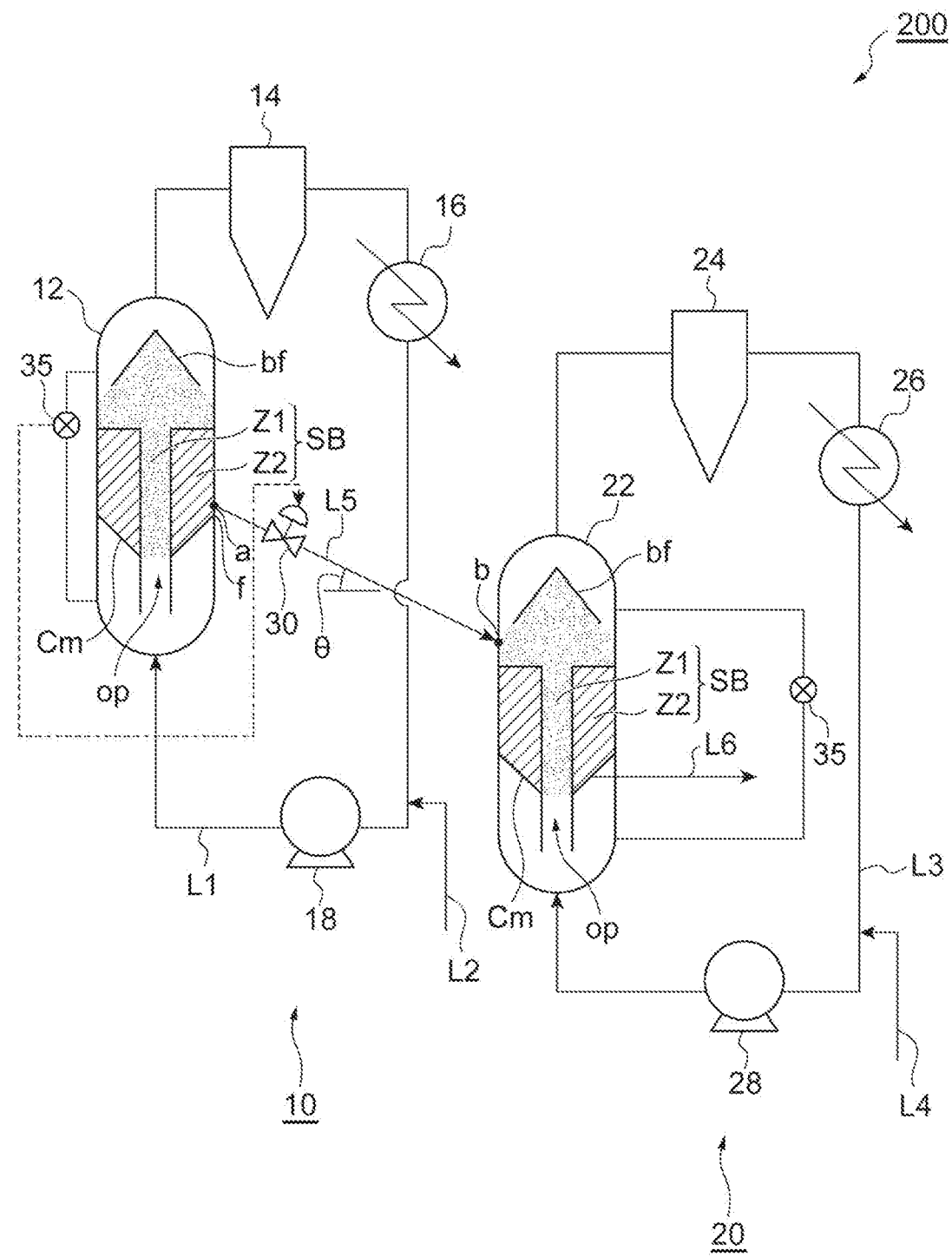
FIG. 2 is a schematic diagram illustrating a production system of a polyolefin in another embodiment of the present invention.
Figure 3:
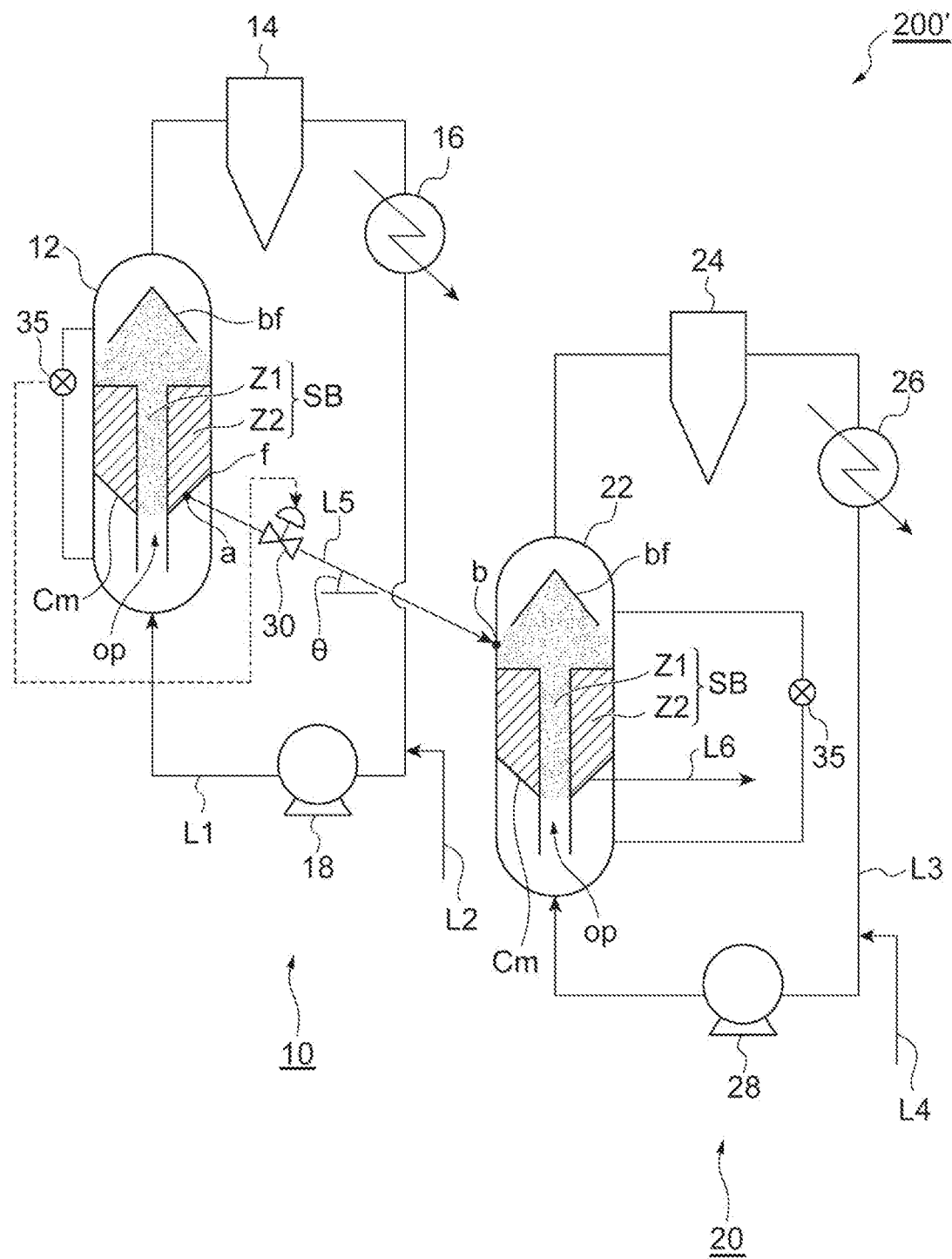
FIG. 3 is a schematic diagram illustrating a production system of a polyolefin in another embodiment of the present invention.

In the case where the particles are spouted in both of the first gas-phase polymerization tank 12 and the second gas-phase polymerization tank 22, as shown in FIG. 2 and FIG. 3, a cone member cm with an inner diameter decreasing toward the lower end, having a gas inlet opening op at the bottom end, is disposed at the bottom of the first gas-phase polymerization tank 12 and the second gas-phase polymerization tank 22, and the gas fed from the circulation line L1 or L3 is fed under the cone member cm, so that the polyolefin particles are spouted on the cone member cm by the gas blowing up from the opening op of the cone member cm to form a spouted bed SB. The spouted bed SB includes a spout part Z1 at which particles ascend together with the gas and a moving bed part Z2 at which particles in a packed state descend.

In order to stably form the spouted bed SB, feeding an amount of gas to achieve the minimum superficial gas velocity Urns or more described in Japanese Unexamined Patent Publication No. 2009-161735 is preferred. The spouted bed height in a spouted bed can be the maximum spouted bed height LsMAX or less described in Japanese Unexamined Patent Publication No. 2009461735. In a tank, a plate-like baffle bf (see a baffle bf in FIG. 2) may be disposed above the opening op. Also, from the viewpoint of forming a stable spouted bed, a cylindrical baffle may be disposed in a tank. In this case, it is preferable that the spouted bed height be higher than the cylindrical baffle.

Figure 4:
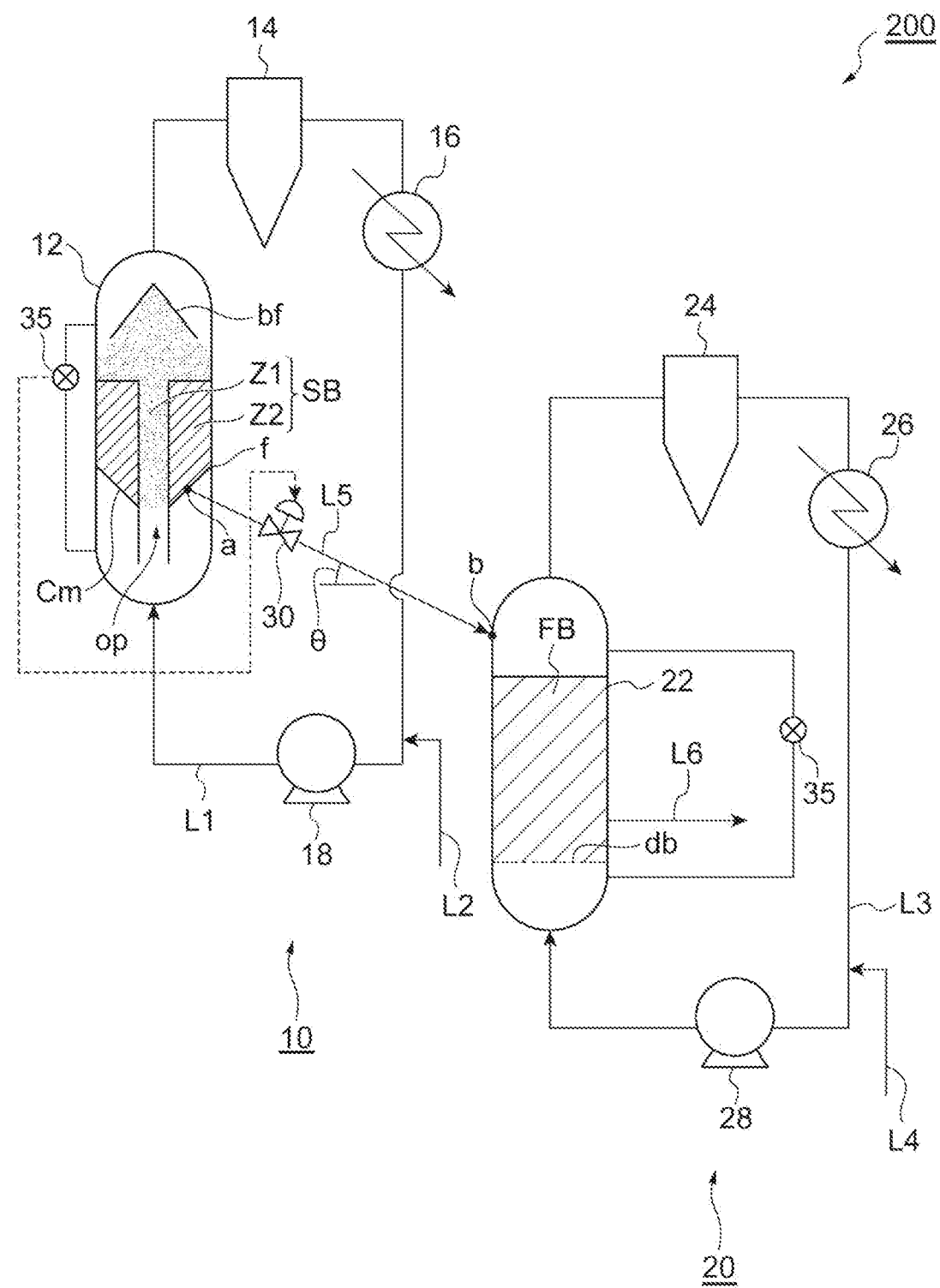
FIG. 4 is a schematic diagram illustrating a production system of a polyolefin in another embodiment of the present invention.
Figure 5:
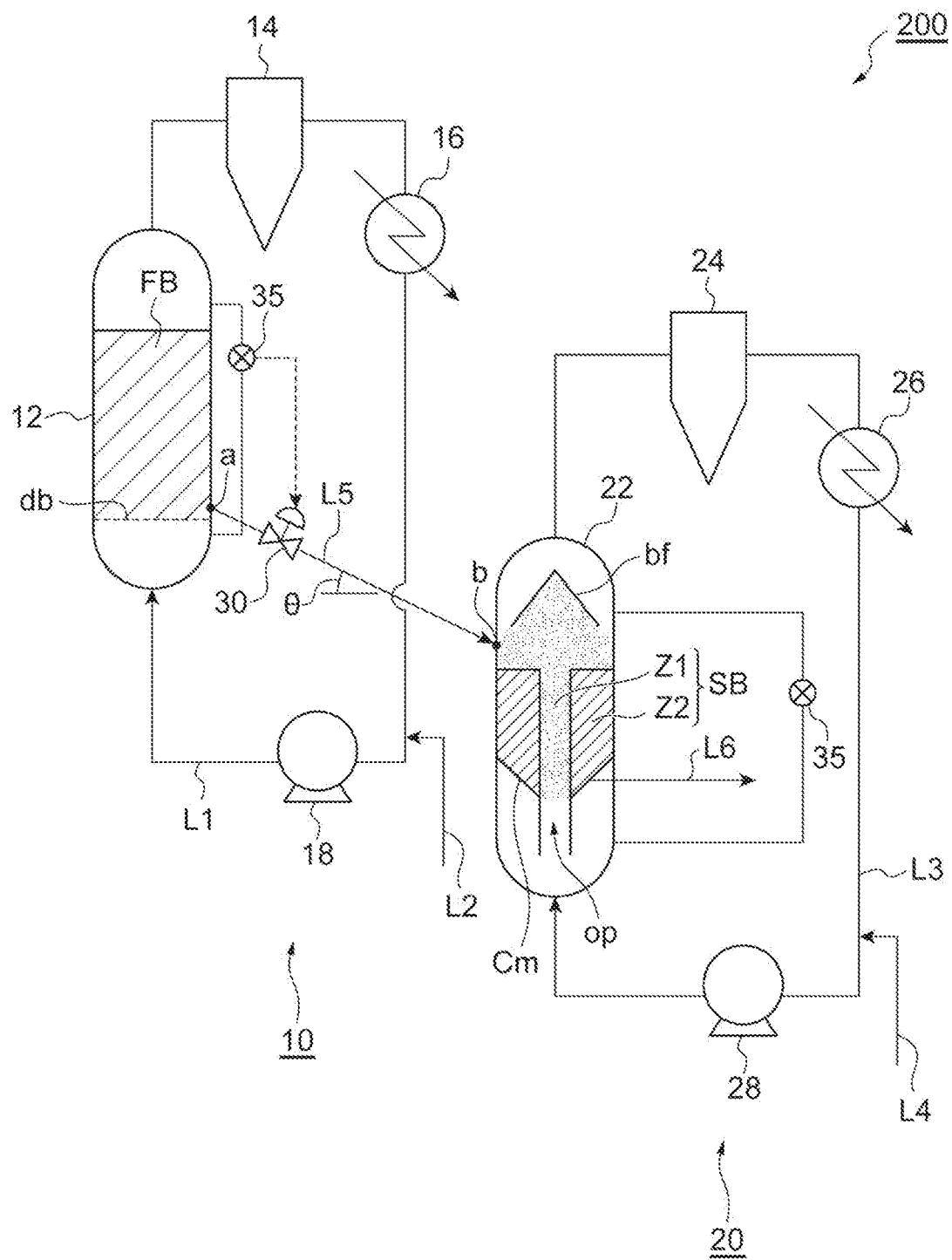
FIG. 5 is a schematic diagram illustrating a production system of a polyolefin in another embodiment of the present invention.

Also, as shown in FIG. 4, a spouted bed SB may be formed in the first gas-phase polymerization tank 12, and a fluidized bed FB may be formed in the second gas-phase polymerization tank 22; or a as shown in FIG. 5, a fluidized bed FB may be formed in the first gas-phase polymerization tank 12, and a spouted bed SB may be formed in the second gas-phase polymerization tank 22.

Figure 6:
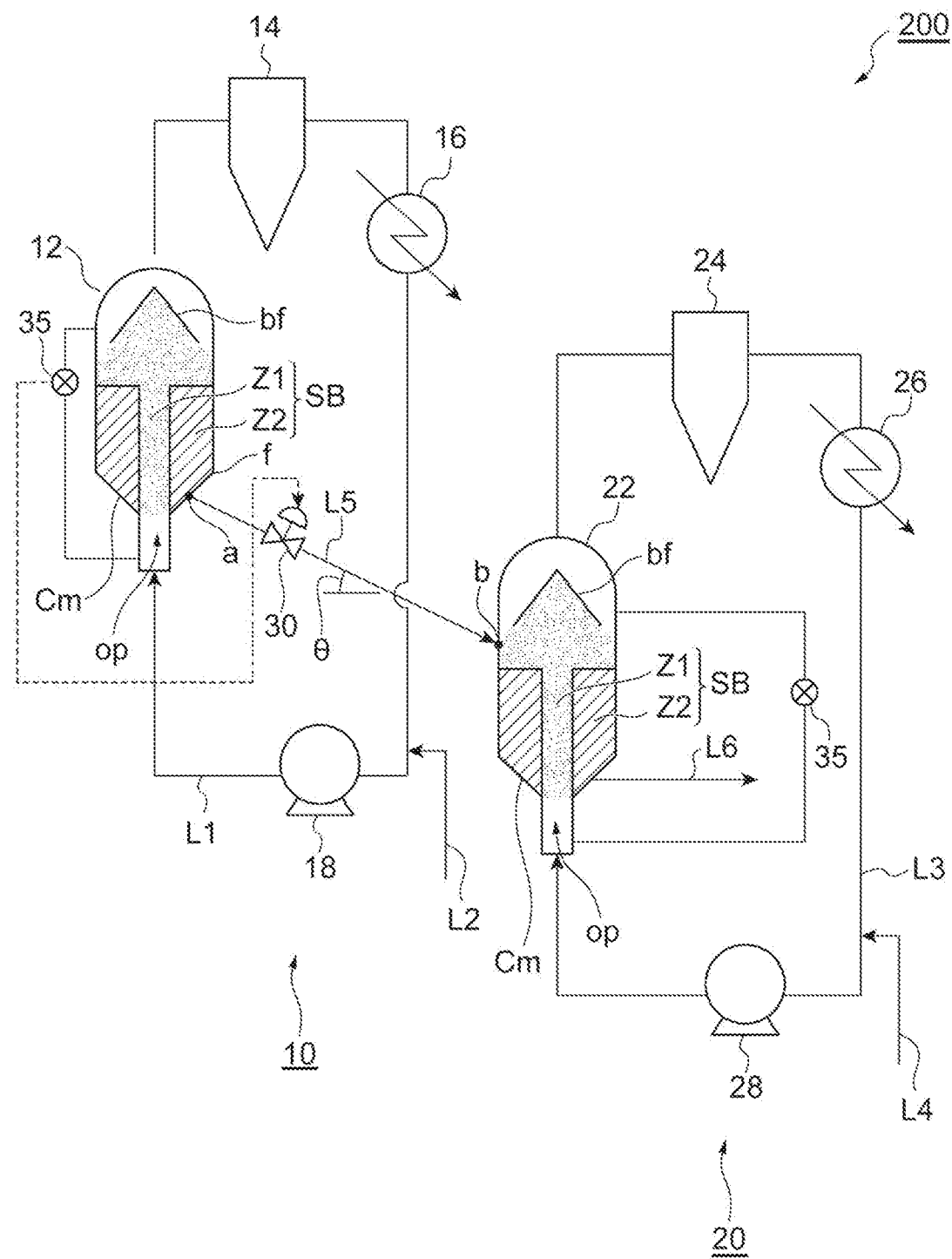
FIG. 6 is a schematic diagram illustrating a production system of a polyolefin in another embodiment of the present invention.

Although the cone member cm is disposed in a tank as an interior part in FIGS. 2 to 4, the cone member cm may constitute the bottom face of a tank, and the gas may be directly fed to the opening op of the cone member cm through a line. For example, FIG. 6 is a flow diagram illustrating a production system 200 with a cone member cm to constitute the bottom face of gas-phase polymerization tanks 12 and 22 in an aspect shown in FIG. 3.

In the spouted bed SB and the fluidized bed FB, polyolefin particles and a monomer gas are well mixed. The uniformity of temperature is therefore enhanced, so that preferred results are obtained with reduced adhesion of particles. In the tank, a stirring device (not shown in drawing) may be disposed, as an aid, to enhance stirring of the particles.

In the circulation line L1, a cyclone 14, a heat exchanger 16, and a compressor 18 are disposed in the flow order. In the circulation line L3, a cyclone 24, a heat exchanger 26, and a compressor 28 are disposed in the flow order.

Unreacted olefin-containing gases discharged from the tops of the first gas-phase polymerization tank 12 and the second gas-phase polymerization tank 22 are fed to the cyclones 14 and 24 through the circulation line L1 and L3, and the cyclones 14 and 24 separate particles from the gases. The heat exchangers 16 and 26 cool the gases separated from the particles. The compressors 18 and 28 apply pressure to the cooled gases to feed the gases to the bottoms of the first gas-phase polymerization tank 12 and the second gas-phase polymerization tank 22. The polyolefin particles separated in the cyclones 14 and 24 may be returned to the first gas-phase polymerization tank 12 and the second gas-phase polymerization tank 22.

In the first gas-phase polymerization tank 12 and the second gas-phase polymerization tank 22, a sensor 35 is disposed to measure the amount of polyolefin particles in the tank (also referred to as particle hold-up). The sensor 35 may be, for example, a pressure difference sensor that measures the pressure difference between the top and the bottom of the fluidized bed or the spouted bed. Since the pressure difference increases as the amount of particles increases, the amount of particles such as the weight of particles (hold-up), the height of the fluidized bed or the spouted bed, and the like can be obtained based on the pressure difference.

(Transfer Pipe)

The transfer pipe L5 allows the first gas-phase polymerization tank 12 to communicate with the second gas-phase polymerization tank 22. The connection place "a" between the first gas-phase polymerization tank 12 and the transfer pipe L5 is higher than the connection place "b" between the second gas-phase polymerization tank 22 and the transfer pipe L5. At the connection place "a", the first gas-phase polymerization tank 12 has an outlet of the particles, and at the connection place "b", the second gas-phase polymerization tank 22 has an inlet of the particles.

Since the connection place "a" is located higher than the connection place "b", the transfer pipe L5 has at least a part having a downward gradient from the first polymerization tank 12 to the second polymerization tank 22. Hereupon, the angle made between the extending direction of the transfer pipe L5 (diagonally downward direction or downward direction) and the horizontal plane is defined as an inclination angle θ of the transfer pipe. From the viewpoint of achieving a further smooth flow of particles, it is preferable that the inclination angle θ is equal to or more than the angle of repose of polyolefin particles. The angle of repose of polyolefin particles is typically 30 to 40°. Meanwhile, in the case where the angle made between the transfer pipe L5 and a horizontal plane is at 90°, although the transfer is easy due to free fall of powder, maintenance may be difficult due to the high tank height of the most upstream reaction tank when using multiple reaction tanks. Under the circumstances, the transfer pipe L5 has a part with θ of more than 0° and 90° or less. θ is preferably 30° or more and 80° or less, more preferably 40° or more and 75° or less.

In the case where the transfer pipe L5 has a plurality of inclination angles, any θ is preferably 0° or more and 90° or less, more preferably 30° or more and 80° or less, furthermore preferably 40° or more and 75° or less.

Although the transfer pipe L5 may have an upward gradient part and/or a horizontal part from the first gas-phase polymerization tank 12 to the second gas-phase polymerization tank 22 in the entire transfer pipe, it is preferable that from the viewpoint of smooth transfer of particles, the transfer pipe L5 has no upward gradient part and/or no horizontal part in the pipe. It is suitable that the angle made between the axial direction (diagonally upward direction) of the upward gradient part and a horizontal plane is at 30° or less.

Although a part of the transfer pipe L5 may be present at a position higher than the connection place "a", and a part of the transfer pipe L5 may be present at a position lower than the height of the connection place "b", it is preferable that from the viewpoint of smooth transfer of particles, the entire transfer pipe L5 is present at a height equal to or lower than the connection place "a", and the entire transfer pipe L5 is present at a height equal to or higher than the connection place "b".

In the case that the fluidized bed FB is formed in the first gas-phase polymerization tank 12 as shown in FIGS. 1 and 5, it is preferable that the connection place "a" is located in the range from the height of the gas dispersion plate db or higher to ½ or less of the height of the fluidized bed FB. It is more preferable that the connection place "a" is located immediately above the gas dispersion plate db, i.e., in the range from the gas dispersion plate db or higher to ⅒ or less of the height of the fluidized bed.

In the case where the spouted bed SB is formed in the first gas-phase polymerization tank 12 as shown in FIGS. 2 to 4 and FIG. 6, it is suitable that the connection place "a" is in the following range, when a contact point "f" represents the contact point between the cone member cm and the inner circumferential wall of the cylindrical member of the gas-phase polymerization tank. Namely, the connection place "a" is located preferably on the slope of the cone member cm, or in the range from the contact point "f" of the cone member cm or higher to ½ of the height of the moving bed part Z2, more preferably on the slope of the cone member cm or in the range from the contact point "f" or higher to ⅒ of the height of the moving bed part Z2. It is further preferable that the connection place "a" is located on the slope of the cone member cm as shown in FIG. 3.

In the case where the fluidized bed FB is formed in the second gas-phase polymerization tank 22 as shown in FIGS. 1 and 4, it is preferable that the connection place "b" is at ½ of the height of the fluidized bed FB or higher. In the case where the spouted bed SB is formed in the second gas-phase polymerization tank 22 as shown in FIGS. 2 to 4, it is preferable that the connection place "b" is at ½ of the height of the moving bed part Z2 in the spouted bed SB or higher. It is most preferable that the connection place "b" is at the height of the fluidized bed. FB or higher or at the height of the moving bed part Z2 in the spouted bed SB or higher.

The transfer pipe L5 may have a valve 30 in the middle. Although the type of the valve 30 is not limited, a v-notch disc-type ball valve is preferred, capable of easily controlling the transfer amount of the polyolefin particles by adjusting valve aperture, hardly causing fouling of polymer particles on a moving member. Examples of the v-notch disc-type ball valve include a A-port valve manufactured by KITZ and a wonder valve manufactured by KTM. Although any valve size may be selected depending on the flow rate of a polymer transferred, a valve with a size of 10 inch or less is preferred, and a valve with a size of 6 inch or less is more preferred, because a large valve requires time in changing the aperture.

By a signal from a sensor 35, the aperture of the valve 30 of the transfer pipe L5 can be controlled, such that the amount of polyolefin particles in the first gas-phase polymerization tank 12 is kept constant.

The adjustment of the aperture of the valve 30 may be continuous or intermittent. Even in a continuous adjustment, in order to prevent the particles accumulated around the valve from being polymerized and agglomerated to occlude the transfer pipe L5, the valve may be fully opened and then fully closed at regular intervals, such that the particles in the valve and in the vicinity thereof are entirely transferred.

(Length of Transfer Pipe)

From the viewpoint of a further smooth flow of particles, it is preferable that the length of the transfer pipe L5 is short. It is more preferable that the transfer pipe L5 is disposed to achieve the shortest length of the transfer pipe L5, in consideration of the gradient of the transfer pipe L5, the installation positions of the valve 30 and other tanks except for the gas-phase polymerization tanks, and the installation positions of the first gas-phase polymerization tank 12 and the second gas-phase polymerization tank 22.

From the viewpoint of forming a more stable fluidized bed or a stable spouted bed, it is preferable that there exist no part of the transfer pipe L5 inserted in the fluidized bed FB or the spouted bed SB. Also, from the viewpoint of forming a more stable fluidized bed or a stable spouted bed, it is preferable that there exist no part of the transfer pipe L5 inserted in the gas phase.

(Regarding Connection Place "a", Connection Place "b", Transfer Pipe L5, and Diameter of Valve 30)

From the viewpoint of controllability of the transfer amount of the polyolefin particles, the diameters of the connection place "a", the connection place "b", the transfer pipe L5, and the valve 30 may be different from each other, for example with installation of a reducer (not shown in drawing) therebetween. From the viewpoint of a further smooth flow of particles, it is preferable that the diameters of the connection place "a", the connection place "b", the transfer pipe L5, and the valve 30 are the same.

The polyolefin particles in the second gas-phase polymerization tank 22 are discharged through the line L6.

(Production Method)

Subsequently, a method for producing a polyolefin with use of the production system 200 is described.

(Polymerization in First Gas-Phase Polymerization Tank)

First, in the first gas-phase polymerization tank 12, an olefin-containing gas fed from the circulation line L1 is polymerized to obtain polyolefin-containing particles. Hereupon, in the first gas-phase polymerization tank 12, it is suitable that polymerization is performed in the presence of a polymerization catalyst. As a method for feeding a polymerization catalyst to the first gas-phase polymerization tank 12, catalyst-containing polyolefin particles produced by polymerizing polyolefin particles in the presence of a catalyst in advance in a preliminary polymerization tank not shown in drawing may be fed. Alternatively, as the polymerization catalyst fed to the first gas-phase polymerization tank 12, a preliminary polymerized catalyst or a solid catalyst may be directly fed to the first gas-phase polymerization tank 12.

(Catalyst for Use in Producing Polyolefin)

Examples of the catalyst for use in producing the polyolefin in the present invention include a Ziegler-Natta catalyst and a Metallocene catalyst, preferably a Ziegler-Natta catalyst. Examples of the Ziegler-Natta catalyst include a Ti—Mg catalyst such as a solid catalyst component obtained by bringing a magnesium compound into contact with a titanium compound, and a catalyst containing a solid catalyst component obtained by bringing a magnesium compound into contact with a titanium compound, an organoaluminum compound, and, on an as needed basis, a third component such as an electron-donating compound; preferably a catalyst containing a solid catalyst component obtained by bringing a magnesium compound into contact with a titanium compound, an organoaluminum compound, and, on an as needed basis, a third component such as an electron-donating compound; more preferably a catalyst containing a solid catalyst component obtained by bringing a magnesium compound into contact with a halogenated titanium compound, an organoaluminum compound, and an electron-donating compound. As the catalyst, a catalyst preliminarily activated by contacting with a small amount of an olefin may be used.

An example of the detail of the catalysts and the production method is disclosed, for example, in Japanese Unexamined Patent Publication No. 2009-161735.

The temperature in the first gas-phase polymerization tank 12 is typically 0 to 120° C., preferably 20 to 100° C., more preferably 40 to 100° C. The pressure in the first gas-phase polymerization tank 12 may be in the range at which an olefin can be present as a gas phase in the first gas-phase polymerization tank 12, i.e., typically from normal pressure to 10 MPaG, preferably 0.2 to 8 MPaG, more preferably 0.5 to 5 MPaG. Hereupon, the pressure in the first gas-phase polymerization tank 12 is represented by $P_1$.

The gas is continuously discharged from the top of the first gas-phase polymerization tank 12 to be circulated through the circulation line L1, so that effective use of unreacted olefin monomers can be suitably achieved. The consumed monomers can be compensated from the line L2. Along with polymerization, the amount of the polyolefin particles in the tank increases. The amount of gas compensated from the line L2 is controlled such that the pressure in the first gas-phase polymerization tank 12 does not fluctuate.

(Transfer of Particles)

The valve 30 of the transfer pipe L5 is continuously or intermittently opened to feed the polyolefin particles in the first gas-phase polymerization tank 12 to the second gas-phase polymerization tank 22.

(Regarding Average Particle Diameter of Polyolefin-Containing Particles)

Any average particle diameter may be employed as the average particle diameter of the polyolefin-containing particles transferred. The average particle diameter of the polyolefin-containing particles transferred is preferably 100 µm to 5000 µm, more preferably 1.50 µm to 4000 µm. In the present specification, the average particle diameter of the polyolefin-containing particles means a volume-based median diameter obtained by a laser diffraction particle diameter distribution analyzer.

(Regarding Shape of Polyolefin-Containing Particles)

Although the shape of the olefin-containing particles may be any shapes, from the viewpoint of a further smooth flow of particles, a nearly spherical shape is preferred.

(Regarding Static Bulk Density of Polyolefin-Containing Particles)

The static bulk density of the polyolefin-containing particles transferred is not limited. The static bulk density of the polyolefin-containing particles is preferably 250 to 600 kg/m³, more preferably 300 to 550 kg/m³.

(Polymerization in Second Gas-Phase Polymerization Tank)

In the second gas-phase polymerization tank 22, in the presence of the polyolefin particles fed from the first gas-phase polymerization tank 12, an olefin-containing gas fed from the circulation line L3 is polymerized to obtain a polyolefin. The particles in the second gas-phase polymerization tank 22 thereby include the polyolefin polymerized in the second gas-phase polymerization tank 22 in addition to the polyolefin transferred from the first gas-phase polymerization tank 12. Although a preliminary polymerized catalyst, a solid catalyst or the like may be separately added in the second gas-phase polymerization tank 22, it is suitable that the olefin polymerization is performed by using a catalyst contained in the polyolefin particles fed from the first gas-phase polymerization tank 12.

The composition of the olefin fed to the second gas-phase polymerization tank may be the same as the composition of the olefin fed to the first gas-phase polymerization tank, or may be different from each other. The detail will be described later.

The temperature of the second gas-phase polymerization tank 22 is typically 0 to 120° C., preferably 20 to 100° C., more preferably 40 to 100° C. The pressure in the second gas-phase polymerization tank 22 may be in the range at which the olefin can be present as a gas phase in the second gas-phase polymerization tank 22, i.e., typically from normal pressure to 10 MPaG, preferably 0.2 to 8 MPaG, more preferably 0.5 to 5 MPaG. Hereupon, the pressure in the second gas-phase polymerization tank 22 is represented by $P_2$.

The gas is continuously discharged from the top of the second gas-phase polymerization tank 22 to be circulated through the circulation line L3, so that effective use of unreacted olefin monomers can be suitably achieved. The consumed monomers can be compensated from the line L4. Along with polymerization, the amount of the polyolefin particles in the tank increases. The amount of gas compensated from the line L4 is controlled such that the pressure in the second gas-phase polymerization tank 22 does not fluctuate.

(Pressure Difference Between First Gas-Phase Polymerization Tank and Second Gas-Phase Polymerization Tank)

In the present embodiment, in particular, the pressure $P_1$ in the first gas-phase polymerization tank 12 and the pressure $P_2$ in the second gas-phase polymerization tank 22 are set to satisfy 130 kPa≥$P_1$−$P_2$≥0.

The pressure $P_1$ in the first gas-phase polymerization tank 12 can be adjusted depending on the amount of the olefin monomers fed to the first gas-phase polymerization tank 12 from the line L2 through the circulation line L1 and the amount of the olefin monomer-containing gas purged from the first gas-phase polymerization tank 12 to the outside of the system. The pressure $P_2$ in the second gas-phase polymerization tank 22 can be adjusted depending on the amount of the olefin monomers fed to the second gas-phase polymerization tank 22 from the line L4 through the circulation line L3 and the amount of the olefin monomer-containing gas purged from the second gas-phase polymerization tank 22 to the outside of the system.

In the case where no fresh olefin monomer is fed to a gas-phase polymerization tank during olefin polymerization, the pressure in the gas-phase polymerization tank decreases in proportion to the amount of the olefin monomers consumed by polymerization. In order to adjust the pressure in a gas-phase polymerization tank to a prescribed value during olefin polymerization, olefin monomers in an amount matching the amount of the olefin monomers consumed by polymerization are fed to the first gas-phase polymerization tank 12 from the line L2 through the circulation line L1, and, in the same manner, olefin monomers in an amount matching the amount of the olefin monomers consumed by polymerization are fed to the second gas-phase polymerization tank 22 from the line L4 through the circulation line L3. On this occasion, in order to adjust the pressure in each of the gas-phase polymerization tanks to a prescribed value, the olefin monomer-containing gas may be purged from each of the gas-phase polymerization tanks to the outside of the system, or may not be purged.

Since the pressure $P_1$ in the gas-phase polymerization tank 12 and the pressure $P_2$ in the gas-phase polymerization tank 22 can be independently adjusted as described above, $P_1$−$P_2$ in the present invention can be controlled by adjustment of the amount of the olefin monomers fed to each of the gas-phase polymerization tanks and the amount of the olefin monomer-containing gas purged to the outside of the system from each of the gas-phase polymerization tanks.

Hereupon, the indicated value of a pressure gauge installed in the gas phase part of the first gas-phase polymerization tank 12 can be regarded as pressure $P_1$. Also, the indicated value of a pressure gauge installed in the gas phase part of the second gas-phase polymerization tank 22 can be regarded as pressure $P_2$. The gas phase part means a part above the fluidized bed FB or a part above the moving bed part Z2 of the spouted bed SB.

According to the method for producing a polyolefin in the present embodiment, the connection place "a" between the first gas-phase polymerization tank 12 and the transfer pipe L5 is located higher than the connection place "b" between the second gas-phase polymerization tank 22 and the transfer pipe L5. As a result, the polyolefin particles in the first gas-phase polymerization tank 12 can be efficiently transferred to the second gas-phase polymerization tank 22 by utilizing gravity. Therefore, the value of $P_1$−$P_2$ can be reduced to 130 kPa or less. The pressure $P_2$ in the second gas-phase polymerization tank 22 thereby does not fall so much from the pressure $P_1$ in the first gas-phase polymerization tank 12, so that the amount of the polyolefin polymerized in the second gas-phase polymerization tank 22 can be increased.

From the viewpoint of smoothly transferring polyolefin particles, satisfying $P_1$−$P_2$>0 is preferred.

Even when the process is operated to satisfy 130 kPa≥$P_1$−$P_2$≥0, $P_1$ and $P_2$ may fluctuate due to any disturbance in some cases. In the present embodiment, a temporal state satisfying $P_1$−$P_2$<0 kPa is allowed. When T1 represents a time in the state satisfying $P_1$−$P_2$<0 kPa, and T0 represents a total time for transporting particles under conditions satisfying 130 kPa≥$P_1$−$P_2$≥0, it is preferable that T1 is ⅒ or less of the time T0, and it is more preferable that T1 is 1/20 or less of the time T0.

In order to prevent the occurrence of large reduction in the transfer amount of the polyolefin particles due to a state satisfying $P_1$−$P_2$<0 kPa resulting from disturbance during operation, it is more preferable that $P_1$−$P_2$≥3 kPa is satisfied in a steady state.

From the viewpoint of improvement in volume efficiency in a gas-phase polymerization tank in the next stage, 100 kPa≥$P_1$−$P_2$ is preferred, and 60 kPa≥$P_1$−$P_2$ is more preferred.

(Regarding Olefin and Polyolefin)

Examples of the olefin fed to the first gas-phase polymerization tank 12 and the second gas-phase polymerization tank 22 include at least one selected from the group consisting of α-olefins having 1 to 12 carbon atoms. For example, in the case where ethylene is fed to a gas-phase polymerization tank, polyethylene-containing particles can be obtained, and in the case where propylene is fed, polypropylene-containing particles can be obtained.

The olefin fed to each of the gas-phase polymerization tanks may include two or more olefins. For example, in the case where at least one selected from the group consisting of ethylene and α-olefins having 3 to 12 carbon atoms are fed, particles containing ethylene-α-olefin copolymers can be obtained. Specifically, in the cases of the α-olefins of propylene, 1-butene, 1-hexene and 4-methyl-1-pentene, particles containing an ethylene-propylene copolymer, an ethylene-1-butene copolymer, an ethylene-1-hexene copolymer and an ethylene-4-methyl-1-pentene copolymer, respectively, can be obtained. Alternatively, in the cases where propylene and at least one olefin selected from the group consisting of α-olefins having 4 to 12 carbon atoms are fed to a gas-phase polymerization tank, particles containing propylene-α-olefin copolymers can be obtained. Specifically, in the case of the α-olefin of 1-butene, particles containing a propylene-1-butene copolymer can be obtained.

It is preferable that the olefin include propylene. As a result, particles containing a polymer or a copolymer including propylene as a monomer unit can be obtained.

Furthermore, to the gas-phase polymerization tank, an olefin monomer having a composition to provide a polymer or a copolymer that is the same as the polymer or the copolymer to constitute the polyolefin particles fed from the previous stage may be fed, or an olefin monomer having a composition to provide a polymer or a copolymer that is different from the polymer or the copolymer to constitute the polyolefin particles fed from the previous stage may be fed. Particles of so-called heterophasic polyolefin material containing a plurality of polyolefins with different monomer units at different ratios from each other can be thereby obtained.

In this case, it is preferable that the respective olefin monomers invariably contain propylene, so that particles of heterophasic propylene polymer, as a mixture of propylene (co-)polymers which invariably contain propylene as a monomer unit, with different monomer units at different ratios from each other, can be obtained.

Examples of the heterophasic propylene polymer in the present embodiment include the following:
(i) a propylene polymer containing a propylene homopolymer (I-1) and a propylene copolymer (II);
(ii) a propylene polymer containing a propylene copolymer (I-2) and a propylene copolymer (II); and
(iii) a propylene polymer containing a propylene homopolymer (I-1), a propylene copolymer (I-2) and a propylene copolymer (II).

The propylene homopolymer (I-1) is a homopolymer of propylene that is only composed of monomer units derived from propylene. More specifically, the propylene copolymer (I-2) and the propylene copolymer (II) are as follows.

Propylene copolymer (I-2) is a copolymer containing monomer units derived from propylene and monomer units derived from at least one olefin selected from the group consisting of ethylene and α-olefins having 4 or more and 12 or less of carbon atoms, with a content of the monomer units derived from at least one olefin selected from the group consisting of ethylene and α-olefins having 4 or more and 12 or less of carbon atoms of 0.01 wt % or more and less than 15 wt %, preferably 0.01 wt % or more and less than 12 wt %, more preferably 3 wt % or more and less than 10 wt %, based on a total weight of the propylene copolymer (I-2) of 100 wt %. The content of the monomer units derived from propylene may be 85 wt % or more, or may be 90 wt % or more. The propylene homopolymer (I-1) together with the propylene copolymer (I-2) is referred to as "propylene polymer (I)".

Propylene copolymer (II) is a copolymer containing monomer units derived from at least one olefin selected from the group consisting of ethylene and α-olefins having 4 or more and 12 or less of carbon atoms and monomer units derived from propylene, with a content of the monomer units derived from at least one olefin selected from the group consisting of ethylene and α-olefins having 4 or more and 12 or less of carbon atoms of 15 wt % or more and 80 wt % or less, preferably 20 wt % or more and 70 wt % or less, more preferably 25 wt % or more and 60 wt % or less, based on a total weight of the propylene polymer (II) of 100 wt %. The content of the monomer units derived from propylene may be 20 wt % or more and 85 wt % or less.

Examples of the propylene copolymer (I-2) include a propylene-ethylene copolymer, a propylene-1-butene copolymer, a propylene-1-hexene copolymer, a propylene-1-octene copolymer, a propylene-1-decene copolymer, a propylene-ethylene-1-butene copolymer, a propylene-ethylene-1-hexene copolymer, a propylene-ethylene-1-octene copolymer, and a propylene-ethylene-1-decene copolymer, and preferably a propylene-ethylene copolymer, a propylene-1-butene copolymer, and a propylene-ethylene-1-butene copolymer.

Examples of the propylene copolymer (II) are the same as described above.

Examples of the heterophasic propylene polymer of the present embodiment include a (polypropylene)-(ethylene-propylene copolymer) heterophasic polymerization material, a (propylene-ethylene copolymer)-(ethylene-propylene copolymer) heterophasic polymerization material, and a (polypropylene)-(ethylene-propylene copolymer)-(ethylene-propylene copolymer) heterophasic polymerization material. Hereupon, the term "(propylene)-(propylene-ethylene) polymerization material" means "a heterophasic propylene polymer including a propylene homopolymer as propylene polymer (I) and a propylene-ethylene copolymer as propylene copolymer (II)". Other corresponding descriptions are also similar.

The content of the propylene copolymer (II) in the heterophasic propylene polymer of the present embodiment is preferably 32 wt % or more, more preferably 35 wt % or more, furthermore preferably 40 wt % or more, based on a total weight of the heterophasic propylene polymer of 100 wt %.

In the present embodiment, examples of the α-olefin having 4 or more and 12 or less carbon atoms for use in the propylene copolymer (I-2) or the propylene copolymer (II) include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene, preferably 1-butene, 1-hexene, and 1-octene, and more preferably 1-butene.

For example, with at least two or more of the polyolefin to constitute the particles fed to the first gas-phase polymerization tank 12, the polyolefin polymerized in the first gas-phase polymerization tank 12, and the polyolefin polymerized in the second gas-phase polymerization tank 22 being different from each other, a desired heterophasic propylene polymer can be produced.

For example, the composition of the olefin fed to the first gas-phase polymerization tank and the composition of the olefin fed to the second gas-phase polymerization tank may be made different from each other.

The present invention is not limited to the embodiment described above, and can be in various modified aspects.

(Presence of Device Between Gas-Phase Polymerization Tanks)

For example, the transfer pipe L5 may have one or more devices other than a valve, not being a gas-phase polymerization tank, between the first gas-phase polymerization tank 12 and the second gas-phase polymerization tank 22. Examples of the device include a particle separation device such as a cyclone and an intermediate particle storage device such as a hopper. These devices are connected to the transfer pipe L5 with a flange or the like, or by welding or the like as with the valve 30. Even in the case where these devices are present between the first gas-phase polymerization tank 12 and the second gas-phase polymerization tank 22, it is necessary that the connection place "a" between the first gas-phase polymerization tank and the transfer pipe L5 is higher than the connection place "b" between the second gas-phase polymerization tank 22 and the transfer pipe L5 (requirement 1), and that the pressure $P_1$ in the first gas-phase polymerization tank 12 and the pressure $P_2$ in the second gas-phase polymerization tank 22 satisfy 130 kPa≥$P_1$−$P_2$≥0 (requirement 2).

When device A1 represents a device between the first gas-phase polymerization tank 12 and the second gas-phase polymerization tank 22, not being a gas-phase polymerization tank, and pressure $P_{A1}$ represents the pressure in the device A1, it is preferable that 130 kPa≥$P_1$−$P_{A1}$≥0 and/or 130 kPa≥$P_{A1}$−$P_2$≥0 are satisfied, and further, 130 kPa≥$P_1$−$P_2$≥0 is satisfied. In the case where N pieces of devices, not being gas-phase polymerization tanks, are present between the first gas-phase polymerization tank 12 and the second gas-phase polymerization tank 22 (wherein N is an integer of 2 or more), when $P_{An}$ represents the pressure in an n-th device, and $P_{A(n-1)}$ represents the pressure in an (n−1)-th device, it is preferable that at least one expression selected from the group consisting of 130 kPa≥$P_1$−$P_{A1}$≥0, 130 kPa≥$P_{A(n-1)}$−$P_{An}$≥0 for one or more integers n of 2 to N, and 130 kPa≥$P_{AN}$−$P_2$≥0 is satisfied, and further, 130 kPa≥$P_1$−

$P_2 \geq 0$ is satisfied. In the case where N pieces of devices, not being gas-phase polymerization tanks, are present between the first gas-phase polymerization tank 12 and the second gas-phase polymerization tank 22 (wherein N is an integer of 2 or more), it is more preferable that 130 kPa$\geq P_1 - P_{A1} \geq 0$, 130 kPa$\geq P_{A(n-1)} - P_{An} \geq 0$ for all integers n of 2 to N, and 130 kPa$\geq P_{AN} - P_2 \geq 0$ are satisfied, and further, 130 kPa$\geq P_1 - P_2 \geq 0$ is satisfied.

On this occasion, when a connection place "c" represents the connection place between a device not being a gas-phase polymerization tank and the transfer pipe L5, although the connection place "c" may be higher than the connection place "a" and the connection place "c" may be lower than the connection place "b", it is preferable that the connection place "c" is at the same height as the connection place "a" or lower than the connection place "a", and the connection place "c" is at the same height as the connection place "b" or higher than the connection place "b". It is, however, necessary, that the connection place "a" is higher than the connection place "b".

(Blowing into Transfer Pipe)

In the case where a smooth particle transfer is prevented by influx of aggregated polyolefin particles having a size larger than normal into the transfer pipe L5, or in order to achieve more smooth transfer of particles, an olefin gas or an inert gas such as nitrogen having a pressure higher than the pressure in the transfer pipe L5 may be made continuously or intermittently flow through the transfer pipe L5. On this occasion, $P_1 - P_2 < 0$ kPa may be temporarily satisfied. In the case where an olefin gas or an inert gas is continuously fed, however, although $P_1 - P_2 < 0$ kPa may be temporarily satisfied, it is necessary to satisfy 130 kPa$\geq P_1 - P_2 \geq 0$ in a steady state.

(Number of Gas-Phase Polymerization Tank)

The production system 200 of a polyolefin may have 3 or more gas-phase polymerization tanks, though having 2 gas-phase polymerization tanks in total in the embodiment. In this case, the gas-phase polymerization tanks are connected in series with the transfer pipes L5, respectively, and it is necessary that in each of combination units of the transfer pipe L5 and a couple of gas-phase polymerization tanks connected with the transfer pipe L5, the connection places "a" and "b" of the transfer pipe L5 and the respective pressures of a couple of the gas-phase polymerization tanks satisfy the requirements 1 and 2. In this case, even though three or more multi-stage gas-phase polymerization tanks are included, the pressure in the final stage hardly decreases. The polyolefin particles obtained by polymerization in each of the gas-phase polymerization tanks can be sequentially transferred to a gas-phase polymerization tank in the next stage.

(Number of Compressors)

Although each of the gas-phase polymerization tanks has a compressor in the embodiment described above, the gas may be fed to a plurality of gas-phase polymerization tanks from one compressor. Even in that case, the pressure in each of the gas-phase polymerization tanks can be independently set by known means such as a pressure regulating valve.

EXAMPLES

The present invention is more specifically described based on Examples as follows, though the present invention is not limited to those Examples.

Examples A-1 to A-15 (Cold Experiment)

In Examples A-1 to A-15, a production system 200 shown in FIG. 1 was used. While in the first gas-phase polymerization tank 12 in high pressure side, a fluidized bed or a spouted bed of polypropylene particles was formed by the propylene gas fed from the circulation line L1, and in the second gas-phase polymerization tank 22 in low pressure side, a fluidized bed of polypropylene particles was formed by the propylene gas fed from the circulation line L3, polypropylene particles were continuously transferred from the first gas-phase polymerization tank 12 to the second gas-phase polymerization tank 22 through the transfer pipe L5.

The particle hold-up in the first gas-phase polymerization tank 12 in high pressure side was set at about 12.5 kg, and the particle hold-up in the second gas-phase polymerization tank 22 in low pressure side was set at about 9 kg. The particle hold-up was calculated through measurement of the differential pressure in the fluidized bed by a differential pressure gauge 35 installed in each of the gas-phase polymerization tanks.

First, the pressure $P_1$ in the first gas-phase polymerization tank 12 in high pressure side was set at about 2.0 MPa (gauge pressure), and the difference $P_1 - P_2$ between the pressure $P_1$ in the first gas-phase polymerization tank 12 in high pressure side and the pressure $P_2$ in the second gas-phase polymerization tank 22 in low pressure side was set at a prescribed differential pressure shown in Table 1. Subsequently, a valve 30 for regulating the transfer amount of the polyolefin particles was opened from a fully closed state to a prescribed aperture, so that about 2.5 kg of polypropylene particles were continuously transferred from the first gas-phase polymerization tank 12 in high pressure side to the second gas-phase polymerization tank 22 in low pressure side. The time period from when the valve 30 for regulating the transfer amount of the polyolefin particles was opened to a prescribed aperture to when fully closed was measured by a stopwatch. The amount of the polypropylene particles actually transferred was determined from the amount of increase in the particle hold-up in the second gas-phase polymerization tank 22 in low pressure side determined by using the differential pressure gauge 35 in the second gas-phase polymerization tank 22 in low pressure side. The particle transfer rate was determined by dividing the transfer amount of the polyolefin particles by the time period required for the transfer. In transfer of polypropylene particles, gas was accompanied with the particles from the first gas-phase polymerization tank 12 in high pressure side to the second gas-phase polymerization tank 22, so that a large amount of propylene gas was fed to the first gas-phase polymerization tank 12 in high pressure side. In contrast, while no propylene gas was fed to the second gas-phase polymerization tank 22 in low pressure side, gas flowing in during transfer was purged from a line not shown in drawing, so that the differential pressure $P_1 - P_2$ between the gas-phase polymerization tanks was maintained at a prescribed value. Other transfer conditions were as follows.

Inner diameter of transfer pipe L5: 1 inch

Inclination of transfer pipe L5 (inclination angle θ made between a horizontal plane and the axial line of an inclination part): 60°

Size of valve 30: 1 inch

Type of valve 30: Λ port valve

Pressure in gas-phase polymerization tank 12 in high pressure side: 2 MPa (gauge pressure)

Tank temperature in gas-phase polymerization tank 12 in high pressure side: 70° C.

Tank temperature in gas-phase polymerization tank 22 in low pressure side: 70° C.

Gas atmosphere in gas-phase polymerization tank 12 in high pressure side: 100% propylene Gas atmosphere in gas-phase polymerization tank 22 in low pressure side: 100% propylene Circulation gas flow rate in gas-phase polymerization tank 12 in high pressure side: 27 m$^3$/hour Circulation gas flow rate in gas-phase polymerization tank 22 in low pressure side: 27 m$^3$/hour Inner diameter of gas-phase polymerization tank 12 in high pressure side: 25 cm Inner diameter of gas-phase polymerization tank 22 in low pressure side: 25 cm Average particle diameter of polypropylene particles: 1169 μm Detail of polypropylene particle: homopolymer of propylene Bulk density of polypropylene particles: 378 kg/m$^3$ (Measurement of Static Bulk Density)

The static bulk density was measured in accordance with HS K6721 by a bulk density measuring device.

(Measurement of Average Particle Diameter of Polypropylene Particles)

The average particle diameter of the polypropylene particles was measured by using a laser diffraction particle diameter distribution analyzer (HELOS, manufactured by Sympatec GmbH).

In Table 1, distinction between a spouted bed and a fluidized bed in each of the gas-phase polymerization tanks, differential pressure $P_1-P_2$ between pressure $P_1$ in the first gas-phase polymerization tank 12 in high pressure side and pressure in the second gas-phase polymerization tank 22 in low pressure side, valve aperture, particle transfer rate, and transfer stability are shown. The transfer stability was rated as "A", in the case where polypropylene particles were transferred without intermission during continuous transfer. The transfer stability was rated as "B", in the case where continuous transfer of particles was interrupted, or in the case where no powder was transferred, regardless with the valve aperture fixed to a prescribed value.

To the first gas-phase polymerization tank 132, a gas feeding line L101 having a blower 131 was connected, so that a spouted bed was formed between a cone member 132$a$ and a baffle 132$b$. The first gas-phase polymerization tank 132 and the metal container 137 were connected with a transfer pipe L102 having an inclination angle θ, and the transfer pipe L102 was provided with a valve 135 and a valve 136. To the metal container 137, metal containers 138 to 140 were connected through a line L103, and the line L103 was provided with a pressure gauge 145. To the line L103, a vacuum pump 146 was connected with a line L104 through a valve 144. The first gas-phase polymerization tank 132 was provided with a differential pressure sensor 134 to measure the height of a spouted bed. The weight of the metal container 137 was measured by a weight measuring device 142.

First, with the valve (ball valve) 135 fully closed, the valve (ball valve) 136 fully opened, and the valve 144 fully closed, gas was fed from a blower 131 to the first gas-phase polymerization tank 132 through a gas feeding line L101, so that a spouted bed of polypropylene particles was formed in the first gas-phase polymerization tank 132. Subsequently, after the aperture of the flow rate regulating valve 136 was adjusted to a prescribed aperture, the valve 144 was fully opened, and after the pressure of a conjugation of the metal containers 137 to 140 was reduced by a vacuum pump 146 while reading a pressure gauge 145 such that the differential pressure $P_1-P_2$ between the pressure $P_1$ in the first gas-phase polymerization tank 132 and the pressure $P_2$ in the metal container 137 reached a prescribed differential pressure shown in Table 2, the valve 144 was fully closed. A positive differential pressure in Table 2 means the pressure $P_1$ in the first gas-phase polymerization tank 132 is higher than the pressure $P_2$ in the metal container 137, while a negative differential pressure means the opposite. Subsequently, the spouted polypropylene particles in the first gas-phase polymerization tank 132 were fed to the metal container 137 through the transfer pipe L102 at an inclination angle θ with the valve 135 fully opened for any several seconds, and then

TABLE 1

| | First gas-phase polymerization tank | Second gas-phase polymerization tank | $P_1-P_2$ [kPa] | Valve aperture [%] | Particle transfer rate [g/second] | Transfer stability |
|---|---|---|---|---|---|---|
| Example A-1 | Spouted bed | Fluidized bed | 5 | 50 | 13.1 | A |
| Example A-2 | Spouted bed | Fluidized bed | 5 | 65 | 32.0 | A |
| Example A-3 | Spouted bed | Fluidized bed | 10 | 40 | 17.6 | A |
| Example A-4 | Spouted bed | Fluidized bed | 10 | 50 | 28.6 | A |
| Example A-5 | Spouted bed | Fluidized bed | 10 | 65 | 55.9 | A |
| Example A-6 | Spouted bed | Fluidized bed | 20 | 40 | 22.5 | A |
| Example A-7 | Spouted bed | Fluidized bed | 20 | 50 | 41.0 | A |
| Example A-8 | Spouted bed | Fluidized bed | 20 | 65 | 95.3 | A |
| Example A-9 | Spouted bed | Fluidized bed | 40 | 50 | 54.2 | A |
| Example A-10 | Fluidized bed | Fluidized bed | 10 | 40 | 27.4 | A |
| Example A-11 | Fluidized bed | Fluidized bed | 10 | 65 | 101.3 | A |
| Example A-12 | Fluidized bed | Fluidized bed | 20 | 40 | 32.5 | A |
| Example A-13 | Fluidized bed | Fluidized bed | 20 | 65 | 121.6 | A |
| Example A-14 | Fluidized bed | Fluidized bed | 40 | 40 | 35.2 | A |
| Example A-15 | Fluidized bed | Fluidized bed | 40 | 65 | 141.5 | A |

Examples B-1 to B-31 and Comparative Example B-1 (Cold Experiment)

Figure 7:
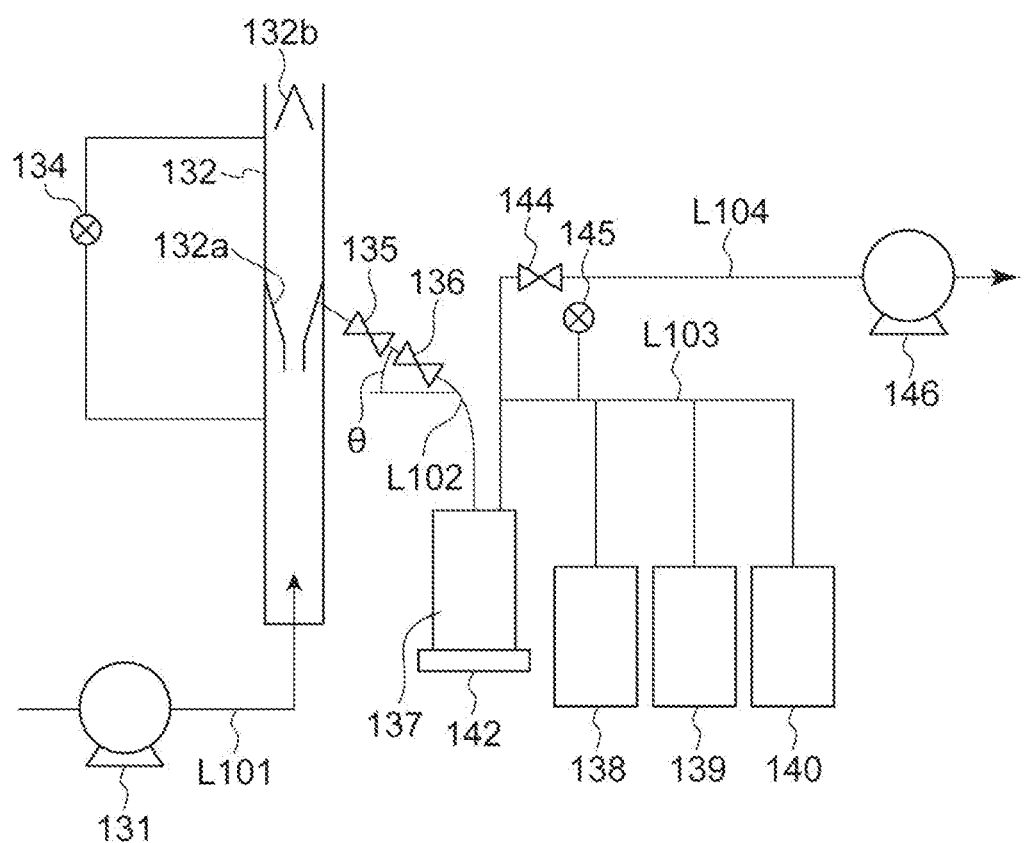
FIG. 7 is a schematic diagram illustrating the experimental device used in Example B.

Using devices shown in FIG. 7, polypropylene particles were continuously transferred from a first gas-phase polymerization tank 132 in high pressure side to a metal container 137 resembling a second gas-phase polymerization tank in low pressure side in a subsequent step.

the valve 135 was fully closed. The time period for which the valve 135 was fully opened was regarded as the time period required for the transfer. Based on the weight increment of the metal container 137 before/after transfer, the amount of polypropylene particles actually transferred to the metal container 137 was determined. The particle transfer rate was determined by dividing the transfer amount of the polyolefin particles by the time period required for the transfer. Since four metal containers 137 to 140 were connected, the pressure $P_2$ of the metal container 137 hardly increased even when gas flowed into the metal container 137 during transfer of the particles.

In Table 2, inclination angle of the transfer pipe L102, size of the valve 136, differential pressure that is a difference $P_1-P_2$ between the pressure $P_1$ in the first gas-phase polymerization tank 132 and the pressure $P_2$ in the metal container 137, aperture of the valve 136, particle transfer rate, particle transfer stability are shown. Other transfer conditions were as follows. In the case where the size of the valve 136 was ½ or ¾, a reducer was installed in front of and behind the valve.

Inner diameter of transfer pipe L102: 2 inch
Inclination angle θ of transfer pipe L102: 45° or 60°
Size of valve 136 for regulating transfer amount of the polyolefin particles: ½ inch, ¾ inch or 2 inch
Type of valve 136 for regulating transfer amount of the polyolefin particles: ball valve
Pressure in first gas-phase polymerization tank 132: atmospheric pressure
Tank temperature in first gas-phase polymerization tank 132: normal temperature
Tank temperature in metal container 137: normal temperature
Gas atmosphere in first gas-phase polymerization tank 132: air
Gas atmosphere in metal container 137: air
Gas feed rate to first gas-phase polymerization tank 132: 6.6 m³/hour
Inner diameter of first gas-phase polymerization tank 132: 50 cm Particle hold-up in first gas-phase polymerization tank 132: 50 kg Average particle diameter of polypropylene particles: 1169 μm Type of polypropylene: homopolymer of propylene Bulk density of polypropylene particles: 378 kg/m³

TABLE 2

| | Inclination angle θ of transfer pipe [°] | Size of valve 36 [Inch] | $P_1$-$P_2$ [kPa] | Aperture of valve 136 [%] | Particle transfer rate [g/second] | Transfer stability |
|---|---|---|---|---|---|---|
| Example B-1 | 60 | 2 | 0 | 100 | 507 | A |
| Example B-2 | 60 | 2 | 3.5 | 100 | 1013 | A |
| Example B-3 | 60 | 2 | 26 | 100 | 1349 | A |
| Example B-4 | 60 | 2 | 52 | 100 | 2105 | A |
| Example B-5 | 60 | 2 | 0 | 44.4 | 99 | A |
| Example B-6 | 60 | 2 | 8.5 | 44.4 | 246 | A |
| Example B-7 | 60 | 2 | 28 | 44.4 | 513 | A |
| Example B-8 | 60 | 2 | 55 | 44.4 | 1463 | A |
| Example B-9 | 45 | 2 | 0 | 100 | 187 | A |
| Example B-10 | 45 | 2 | 3.5 | 100 | 1060 | A |
| Example B-11 | 45 | 2 | 7.6 | 100 | 1350 | A |
| Example B-12 | 60 | ½ | 0 | 100 | 20 | A |
| Example B-13 | 60 | ½ | 8 | 100 | 48 | A |
| Example B-14 | 60 | ½ | 18 | 100 | 73 | A |
| Example B-15 | 60 | ½ | 27 | 100 | 108 | A |
| Example B-16 | 60 | ½ | 0 | 72.2 | 8 | A |
| Example B-17 | 60 | ½ | 9 | 72.2 | 26 | A |
| Example B-18 | 60 | ½ | 18 | 72.2 | 41 | A |
| Example B-19 | 60 | ½ | 28 | 72.2 | 68 | A |
| Example B-20 | 60 | ¾ | 0 | 100 | 62 | A |
| Example B-21 | 60 | ¾ | 9 | 100 | 147 | A |
| Example B-22 | 60 | ¾ | 19 | 100 | 222 | A |
| Example B-23 | 60 | ¾ | 29 | 100 | 310 | A |
| Example B-24 | 60 | ¾ | 0 | 72.2 | 11 | A |
| Example B-25 | 60 | ¾ | 9 | 72.2 | 59 | A |
| Example B-26 | 60 | ¾ | 19 | 72.2 | 89 | A |
| Example B-27 | 60 | ¾ | 28 | 72.2 | 213 | A |
| Example B-28 | 60 | ¾ | 0 | 50 | 7 | A |
| Example B-29 | 60 | ¾ | 9 | 50 | 21 | A |
| Example B-30 | 60 | ¾ | 18 | 50 | 37 | A |
| Example B-31 | 60 | ¾ | 28 | 50 | 49 | A |
| Comparative Example B-1 | 60 | 2 | −1 | 100 | 0 | B |

Example C and Comparative Example C
(Polymerization Experiment of Heterophasic Propylene Polymer)

(1-1a) Preliminary Polymerization

In an autoclave made of stainless steel with a stirrer having an internal volume of 3 L, sufficiently dehydrated and deaerated 1.3 L of n-hexane, 20 mmol of triethylaluminum, and 0.4 mmol of tert-butyl-n-propyldimethoxysilane were accommodated. Into there, 28 g of a solid catalyst component was added, and 28 g of propylene was continuously fed into the autoclave over about 10 minutes, with the internal temperature thereof maintained at about 10° C., so that a preliminary polymerization was performed. Subsequently, the preliminary polymerization slurry was transferred to an autoclave made of stainless steel (SUS316L) with a stirrer having an internal volume of 260 L, and 170 L of butane in a liquid state was added thereto to make slurry of a preliminary polymerized catalyst component.

(1-1b) Main Polymerization

In a production system equipped with a bulk polymerization reactor A and three gas-phase polymerization reactors (a multi-stage gas-phase polymerization reactor B, a fluidized bed-type reactor C and a fluidized bed-type reactor D)

disposed in series in this order, a propylene homopolymer (I-1) was produced in the following polymerization step I, and the produced polymer was transferred to the next stage without deactivation. In the following polymerization step II, a propylene homopolymer (I-1) was produced and the produced polymer was transferred to the next stage without deactivation. In the following polymerization step III-1 and the following polymerization step an ethylene-propylene copolymer (II) was produced.

[Polymerization Step I (Polymerization of Propylene Using Olefin Pre-Polymerization Reaction Device)]

Using a vessel-type bulk polymerization reactor A made of stainless steel (SUS304) with a stirrer, a bulk polymerization of propylene and ethylene was performed to produce a propylene homopolymer (I-1). Namely, propylene, hydrogen, triethylaluminum, tert-butyl-n-propyldimethoxysilane and the slurry of preliminary polymerized catalyst component produced in (1-1a) were continuously fed to the bulk polymerization reactor A to perform a polymerization reaction, through which polyolefin particles containing a propylene homopolymer (I-1) as main component were obtained. The reaction conditions were as follows.

Polymerization temperature: 55° C.
Stirring rate: 150 rpm
Liquid level in reactor: 18 L
Propylene feed rate: 25 kg/hour
Hydrogen feed rate: 82.5 NL/hour
Triethylaluminum feed rate: 26.6 mmol/hour (Example C), 29 mmol/hour (Comparative Example C)
Tert-butyl-n-propyldimethoxysilane feed rate: 1.32 mmol/hour (Example C), 1.39 mmol/hour (Comparative Example C)
Preliminary polymerized catalyst component slurry feed rate (in terms of polymerization catalyst component): 1.53 g/hour (Example C), 1.49 g/hour (Comparative Example C)
Polymerization pressure: 3.45 MPa (gauge pressure)

[Polymerization Step II (Propylene Homopolymerization (Gas-Phase Polymerization) in Multi-Stage Gas-Phase Polymerization Reaction Device)]

A multi-stage gas-phase polymerization reactor B having 6-stage reaction regions in vertical direction including a top stage as a fluidized bed and remaining 5 stages as spouted beds was prepared as a multi-stage gas-phase polymerization reaction device. From the previous bulk polymerization reactor A to the fluidized bed as the top stage of the multi-stage gas-phase polymerization reactor B, the slurry containing the polyolefin particles and propylene in a liquid state obtained in the polymerization step I were intermittently fed without deactivation.

The transfer of polyolefin particles between stages in the multi-stage gas-phase polymerization reactor B was performed by a double valve method. The transfer means transfers polypropylene particles to a reaction region on a lower stage by connecting an upper stage reaction region and a lower stage reaction region with a 1-inch size pipe having 2 on-off valves, opening the upper valve with the lower valve closed so as to store polyolefin particles between the upper-stage reaction region and the lower valve, and subsequently, closing the upper valve and then opening the lower valve.

From the bottom of the multi-stage gas-phase polymerization reactor B having the structure described above, propylene and hydrogen were continuously fed. A fluidized bed or a spouted bed was thereby formed in each of the reaction regions, and the feed rates of propylene and hydrogen were controlled such that the gas composition and pressure were kept constant. While purging excessive gas, polymerization of monomers was further performed to produce a propylene homopolymer (I-1), so that polyolefin particles containing a propylene homopolymer (I-1) as main component were obtained. The reaction conditions were as follows.

Polymerization temperature: 70° C.
Polymerization pressure: 2.00 MPa (gauge pressure)

[Polymerization Step III-1 (Propylene-Ethylene Copolymerization (Gas-Phase Polymerization) in Fluidized Bed-Type Reactor C)]

The polyolefin particles discharged from the previous fluidized bed at the bottom stage of the multi-stage gas-phase polymerization reactor B were intermittently fed to the fluidized bed-type reactor C as a fluidized bed-type olefin polymerization reaction device through a transfer pipe comprising a Λ port valve. The connection place between the previous fluidized bed at the bottom stage of the multi-stage gas-phase polymerization reactor B and the transfer pipe was higher than the connection place between the fluidized bed-type reactor C and the transfer pipe. The inclination angle θ of the transfer pipe was 60°. The fluidized bed-type reactor C in the polymerization step III-1 had a one-stage fluidized bed in vertical direction as a reaction region.

In Example C, the pressure in the multi-stage gas-phase polymerization reactor B was 2.00 MPa, and the pressure in the fluidized bed-type reactor C was 1.97 MPa, having resulted in $P_1-P_2=0.03$ MPa. In Comparative Example C, the pressure in the multi-stage gas-phase polymerization reactor B was 2.00 MPa, and the pressure in the fluidized bed-type reactor C was 1.60 MPa, having resulted in $P_1-P_2=0.40$ MPa. Through valve aperture adjustment, the polyolefin particles were transferred from the previous fluidized bed on the bottom stage of the multi-stage gas-phase polymerization reactor B to the fluidized bed type reactor C.

To the fluidized bed-type reactor C having the structure described above, propylene, ethylene and hydrogen were continuously fed, and while adjusting the gas feed rate and purging excessive gas such that the gas composition and the pressure were kept constant, propylene and ethylene were copolymerized in the presence of polypropylene particles to produce an ethylene-propylene copolymer (II), so that particles of heterophasic propylene polymer containing the ethylene-propylene copolymer (II) in addition to the propylene homopolymer (I-1) were obtained. The reaction conditions were as follows.

Polymerization temperature: 70° C.
Polymerization pressure in Example C: 1.97 MPa (gauge pressure)
Polymerization pressure in Comparative Example C: 1.60 MPa (gauge pressure)

The gas concentration ratio in the fluidized bed-type reactor C in Example C, ethylene/(propylene+ethylene), was 25.3 mol %. The gas concentration ratio in a reactor can be determined from a propylene concentration and an ethylene concentration. The gas concentration ratio in the fluidized bed-type reactor C in Comparative Example C, ethylene/(propylene+ethylene), was 24.5 mol %.

[Polymerization Step III-2 (Propylene-Ethylene Copolymerization (Gas-Phase Polymerization) in Fluidized Bed-Type Reactor D)]

The polyolefin particles discharged from the previous fluidized bed-type reactor C were intermittently fed to the fluidized bed-type reactor D as a fluidized bed-type olefin polymerization reaction device through a transfer pipe comprising a Λ port valve. The connection place between the previous fluidized bed type reactor C and the transfer pipe was higher than the connection place between the fluidized bed-type reactor D and the transfer pipe. The inclination angle θ of the transfer pipe was 60°. The fluidized bed-type reactor D in the polymerization step III-2 had a one-stage fluidized bed in vertical direction as a reaction region.

In Example C, the pressure in the fluidized bed-type reactor C was 1.97 MPa, and the pressure in the fluidized bed-type reactor D was 1.93 MPa, having resulted in $P_1-P_2=0.04$ MPa. In Comparative Example C, the pressure in the fluidized bed-type reactor C was 1.60 MPa, and the pressure in the fluidized bed-type reactor D was 1.20 MPa, having resulted in $P_1-P_2=0.40$ MPa. Through valve aperture adjustment, the polyolefin particles were transferred from the previous fluidized bed-type reactor C to the fluidized bed-type reactor D.

Except for the following conditions, propylene and ethylene were copolymerized in the same manner as in the polymerization step III-1 to further produce an ethylene-propylene copolymer (II), so that particles of heterophasic propylene polymer containing the propylene homopolymer (I-1) and the ethylene-propylene copolymer (II) were obtained.

Polymerization temperature: 70° C.

Polymerization pressure in Example C: 1.93 MPa (gauge pressure)

Polymerization pressure in Comparative Example C: 1.20 MPa (gauge pressure)

The gas concentration ratio in the fluidized bed-type reactor D in Example C, ethylene/(propylene+ethylene), was 25.4 mol %. The gas concentration ratio in the fluidized bed-type reactor D in Comparative Example C, ethylene/(propylene+ethylene), was 24.1 mol %.

(Ethylene Unit Content in Heterophasic Propylene Polymer Obtained (Unit: Wt %))

The ethylene unit content in the heterophasic propylene polymer obtained was determined by an IR spectrum method in accordance with IR spectrum measurement described on page 619 in Polymer Handbook (published by Kinokuniya, in 1995). The term "ethylene unit" in the specification means a structure unit derived from ethylene.

The content of the monomer units derived from ethylene in the ethylene-propylene copolymer (II) contained in the heterophasic propylene polymer was determined based on the following expression.

Content of monomer units derived from ethylene in ethylene-propylene copolymer (II) contained in heterophasic propylene polymer=(content of ethylene unit in heterophasic propylene polymer)/(proportion of polymer produced in polymerization steps (III-1+III-2) in total polymer output)×100

(Regarding Volume Efficiency)

Hereupon, as an index representing the total output of a polyolefin in all the gas-phase polymerization tanks relative to the total volume of all the gas-phase polymerization tanks (a multi-stage gas-phase polymerization reactor B for use in the polymerization step II, a fluidized bed-type reactor C for use in the polymerization step III-1, and a fluidized bed-type reactor D for use in the polymerization step III-2), "volume efficiency (II+III-1+III-2)" was determined. Also, as an index representing the output of a polyolefin in the polymerization step III-1 and the polymerization step III-2 relative to the total volume of the gas-phase polymerization tanks of a fluidized bed-type reactor C for use in the polymerization step III-1, and a fluidized bed-type reactor D for use in the polymerization step III-2, "volume efficiency (III-1+III-2)" was determined. In the present specification, in determination of the volume efficiency, a particle hold-up mass was used as the value corresponding to the volume of a gas-phase polymerization tank.

The volume efficiency (II+III-1+III-2) is a value of PP/CAT (II+III-1+III-2) calculated by the following method divided by the total of the particle hold-up mass in the polymerization step II, the polymerization step III-1 and the polymerization step III-2.

The volume efficiency (III-1+III-2) is a value of PP/CAT (III-1+III-2) calculated by the following method divided by the total of the particle hold-up mass in the polymerization steps III-1 and III-2.

(Regarding PP/CAT)

PP/CAT (II+III-1+III-2) is a value of the total output of a polyolefin per hour in the polymerization step II, the polymerization step III-1 and the polymerization step III-2 divided by the solid catalyst feed rate. PP/CAT (II+III-1+III-2) indicates the output per hour in all the gas-phase polymerization steps (the polymerization steps II, III-1 and III-2) per solid catalyst feed rate.

PP/CAT (III-1+III-2) is a value of the total output of a polyolefin per hour in the polymerization steps III-1 and III-2 divided by the solid catalyst feed rate. PP/CAT (III-1+III-2) indicates the output per hour in the polymerization steps III-1 and III-2 per solid catalyst feed rate.

The polymerization conditions, the output and the like in Example C and Comparative Example C are shown in Table 3.

TABLE 3

| | | | Example C | Comparative Example C |
|---|---|---|---|---|
| Polymerization step I | Temperature | ° C. | 55 | 55 |
| | Stirring rate | rpm | 150 | 150 |
| | Liquid volume | L | 18 | 18 |
| | Propylene feed rate | kg/hour | 25 | 25 |
| | Hydrogen feed rate | NL/hour | 82.5 | 82.5 |
| | Triethylaluminum feed rate | mmol/hour | 26.6 | 29 |
| | Tert-butyl-n-propyl-dimethoxysilane feed rate | mmol/hour | 1.32 | 1.39 |
| | Solid catalyst feed rate | g/hour | 1.53 | 1.49 |
| | Pressure | MPaG | 3.45 | 3.42 |
| Polymerization step II | Temperature | ° C. | 70 | 70 |
| | Pressure | MPaG | 2 | 2 |
| | Particle hold-up | kg | 34.2 | 35 |
| Polymerization step III-1 | Temperature | ° C. | 70 | 70 |
| | Pressure | MPaG | 1.97 | 1.6 |
| | Ethylene/(ethylene + propylene) concentration ratio | mol % | 25.3 | 24.5 |
| | Particle hold-up | kg | 35.8 | 35.2 |
| Polymerization step III-2 | Temperature | ° C. | 70 | 70 |
| | Pressure | MPaG | 1.93 | 1.2 |
| | Ethylene/(ethylene + propylene) concentration ratio | mol % | 25.4 | 24.1 |
| | Particle hold-up | kg | 14.7 | 14.3 |

TABLE 4

|  |  | Example C | Comparative Example C |
|---|---|---|---|
| Ethylene content in heterophasic propylene polymer | wt % | 10.7 | 8.4 |
| Ethylene content in ethylene-propylene copolymer (II) contained in heterophasic propylene polymer | wt % | 34.5 | 33.2 |
| Bulk density of particles of heterophasic propylene polymer | kg/m³ | 446 | 440 |
| Average particle diameter of particles of heterophasic propylene polymer | μm | 1476 | 1393 |
| Polymer output in polymerization step (I) | kg/hour | 2.44 | 2.38 |
| Polymer output in polymerization step (II) | kg/hour | 20.86 | 21.02 |
| Polymer output in polymerization step (I + II) | kg/hour | 23.3 | 23.4 |
| Polymer output in polymerization step (III-1 + III-2) | kg/hour | 10.4 | 7.9 |
| Polymer output in polymerization step (I + II + III-1 + III-2) | kg/hour | 33.7 | 31.3 |
| Polymer output in polymerization step (II + III-1 + III-2) | kg/hour | 31.26 | 28.92 |
| Proportion of polymer produced in polymerization step in total polymer output (III-1 + III-2) | wt % | 31 | 25.3 |
| Mass of polymer produced in polymerization step (III-1 + III-2) per mass of solid catalyst fed | kg/kg | 6845 | 5320 |
| Mass of polymer produced in polymerization step (II + III-1 + III-2) per mass of solid catalyst fed | kg/kg | 20431 | 19409 |
| Total particle hold-up in polymerization step (III-1 + III-2) | kg | 50.5 | 49.5 |
| Total particle hold-up in polymerization step (II + III-1 + III-2) | kg | 84.7 | 84.5 |
| Volume efficiency in polymerization step (III-1 + III-2) | 1/kg | 135.5 | 107.5 |
| Volume efficiency in polymerization step (II + III-1 + III-2) | 1/kg | 241.2 | 229.7 |

As described above, in Example C, the volume efficiency (II+III-1+III-2) and the volume efficiency (III-1+III-2) were larger than those in Comparative Example C, and a better production efficiency was therefore achieved.

The polyolefin obtained by using the polyolefin production system of the present invention can be used, for example, as raw material of vehicle parts such as vehicle interior parts and exterior parts, food and medical containers, parts of furniture and electrical appliances, and civil engineering and construction material.

What is claimed is:

1. A method for producing a polyolefin using a polyolefin production system equipped with a first gas-phase polymerization tank and a second gas-phase polymerization tank connected to the first gas-phase polymerization tank through a transfer pipe, the method comprising the following steps 1 to 3 and satisfying the following requirements 1 and 2:
    Step 1: a step of polymerizing an olefin in the first gas-phase polymerization tank to obtain polyolefin-containing particles;
    Step 2: a step of transferring the polyolefin-containing particles obtained in the step 1 to the second gas-phase polymerization tank through the transfer pipe; wherein a fluidized bed of the polyolefin particles or a spouted bed of the polyolefin particles and having a moving bed part is formed in the second gas-phase polymerization tank; and
    Step 3: a step of polymerizing an olefin in the presence of the polyolefin-containing particles transferred in the step 2 in the second gas-phase polymerization tank; and
    Requirement 1: the connection place "a" between the first gas-phase polymerization tank and the transfer pipe is higher than the connection place "b" between the second gas-phase polymerization tank and the transfer pipe, wherein the connection place "b" is at the height of the top of the fluidized bed or higher, or at the height of the top of the moving bed part in the spouted bed or higher; and
    Requirement 2: when $P_1$ represents the pressure in the first gas-phase polymerization tank and $P_2$ represents the pressure in the second gas-phase polymerization tank, 130 kPa≥$P_1P_2$>0 is satisfied.

2. The method according to claim 1, wherein a spouted bed of the polyolefin particles is formed in at least one of the first gas-phase polymerization tank and the second gas-phase polymerization tank.

3. The method according to claim 1, wherein the polymerization in each of the step 1 and the step 3 is performed in the presence of a catalyst.

4. The method according to claim 1, wherein the transfer pipe comprises a valve, and in the step 2, the transfer amount of the polyolefin particles is adjusted through aperture adjustment of the valve.

5. The method according to claim 1, wherein $P_1-P_2 \geq 3$ kPa.

* * * * *